INVENTOR.
JOHN H. LONG
ATTORNEY

United States Patent Office 2,729,699
Patented Jan. 3, 1956

2,729,699

FACSIMILE SYSTEM WHEREIN THE RECORDING IS A MODIFICATION OF THE COPY

John H. Long, Flushing, N. Y., assignor to Faximile, Inc., New York, N. Y., a corporation of Delaware Application January 18, 1951, Serial No. 206,676

4 Claims. (Cl. 178—6.6)

The present invention concerns facsimile systems and, in particular, facsimile systems and devices for producing a type of recording suitable for easy tactual reading by the blind.

In the art of facsimile, printed matter, pictures and the like are scanned by a suitable pick-up device, usually a photoelectric cell, and electrical signals representing the density variations of the subject copy are transmitted by wire or radio to a different point where they are reproduced to form the facsimile recording. Common forms of reproducers include photographic, electrolytic, and various forms of mechanical imprinting, utilizing ink or a carbon paper. It has been found that the reproduced copy may be made immediately useful to the blind by embossing a recording sheet with the intelligence signals transmitted so that the blind may read it through their tactual sense. In order to make the embossed recordings more readily readable, they are usually enlarged with respect to the original subject copy. In addition, it has also been found advantageous to render the vertical components of the letters forming the text narrower than the original, in order that they will be sharp and well defined to the sense of touch of the blind.

It is therefore a general object of this invention to provide a facsimile system wherein the electrical signal derived from scanning graphic material is modified in such a way that the portions of the signal representing black are narrowed by a predeterminable amount. As a result, the modified signal, when applied to a recorder which may be of the embossing type, reproduces the characters scanned with narrowed vertical portions.

One system for accomplishing this narrowing of the characters has been described in Patent 2,657,258 entitled, "Facsimile System Wherein the Recording Is a Modification of the Copy," the inventor being Frank A. Hester. The patent referred to describes one system in which the vertical lines of characters are narrowed by a constant amount which may be pre-set for the particular type of character text being scanned. The present specification describes an improved system for performing the narrowing operation. While the system of the above-referred-to patent has many advantages in producing recordings which may be read tactually, it was found that, under certain circumstances, the vertical components were entirely eliminated. The present invention relates to a method of and means for narrowing the vertical portions of characters by an improved method, and it also provides a minimum width below which the vertical portions cannot be narrowed. It is therefore an object of this invention to provide an improved facsimile signal narrowing circuit wherein the vertical portions of characters cannot be lost in the narrowing process.

These and other objects of the invention will be apparent to those skilled in the art from the following description taken together with the appended drawings.

Briefly, according to the present invention, graphic material is scanned by a photoelectric cell to generate a facsimile signal consisting of pulses having two distinct amplitude levels, one representing white and the other representing black. The facsimile signal is applied to a first branch circuit having a pulse transmission means including an adjustable time delay circuit which delays the transition of the transmitted pulses from white to black only thereby reducing the duration of black level portions of the signal. This is equivalent to narrowing the vertical portions of printed characters. The signal is then applied to a balanced modulator.

The facsimile signal from the photoelectric cell is also applied to a second branch circuit including a differentiating circuit which generates pointed pulses when the facsimile signal changes from black to white and from white to black. The pulses generated on changes from black to white are amplified and squared and then are applied to the balanced modulator. The output of the balanced modulator is a signal wherein black is represented by the narrowed output of the first branch together with the output of the second branch. In the recording, the width of vertical portions of characters can be reduced any desired amount by the first branch but cannot be less than the width determined by the second branch.

Figure 1:
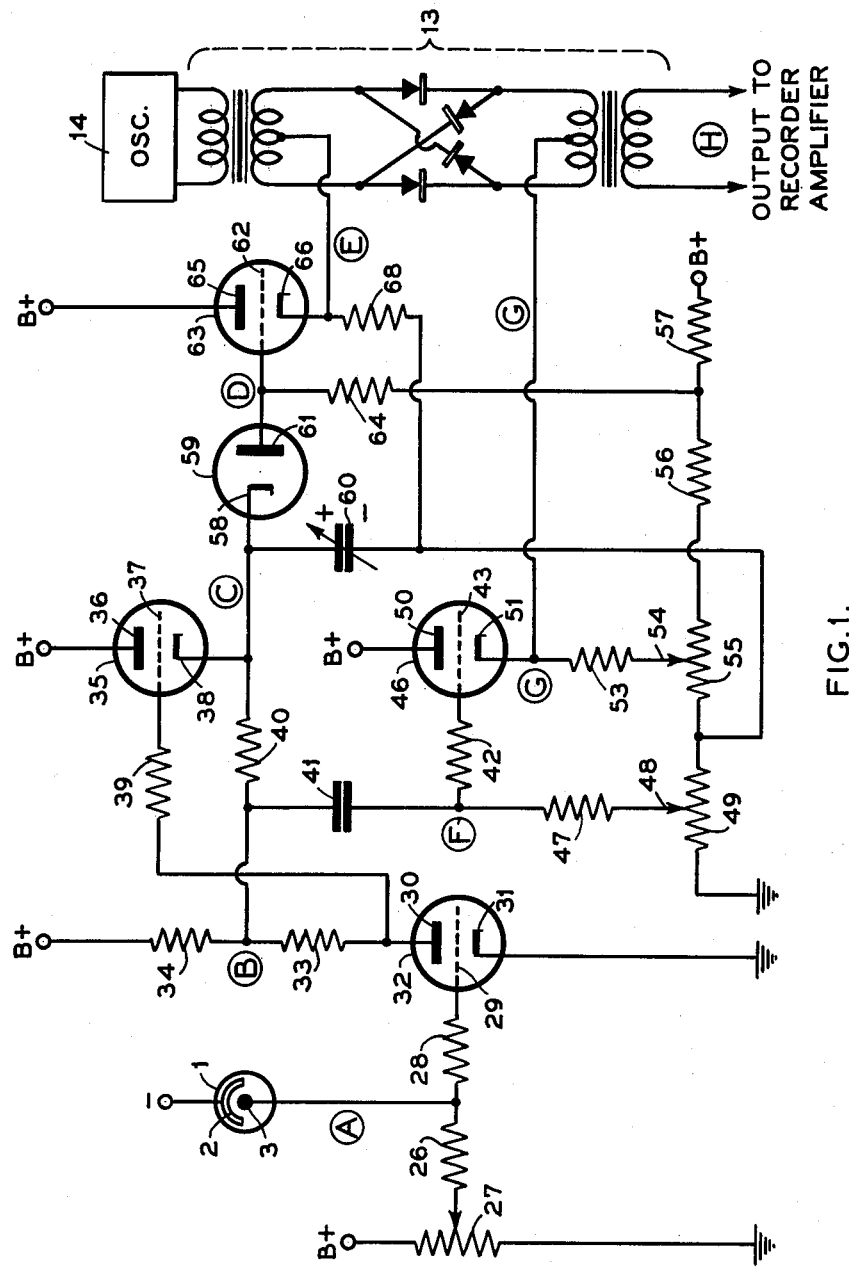
Fig. 1 is a circuit digaram of a preferred form of the invention.

Referring now in greater detail to the drawings, a photocell 1 scans copy point-by-point and line-by-line. Photocell 1 has its photocathode 2 connected to a source of negative potential and its anode 3 connected through an output load resistor 26 to a point on resistor 27 of a high potential source. The signal developed on load resistor 26 is applied through resistor 28 to grid 29 of vacuum tube 32. The cathode 31 of tube 32 is connected to ground and the plate 30 is connected through plate load resistors 33 and 34 to a suitable source of high potential.

The voltages in the plate circuit of tube 32 are applied to a first branch circuit including triode 35, a time delay circuit including capacitor 60, diode 59, and triode 63. The plate side of load resistor 33 is connected through resistor 39 to grid 37 of tube 35. The other side of load resistor 33 is connected through resistor 40 to the cathode 38 of tube 35, the cathode 58 of diode 59 and the variable capacitor 60 in the time delay circuit. The other side of capacitor 60 is connected to a positive potential point in the voltage divider including resistors 49, 55, 56 and 57. This side of capacitor 60 is also connected through cathode resistor 68 to cathode 66 of tube 63. Plate 65 of tube 63 is connected to a suitable source of positive voltage, and grid 62 is connected to plate 61 of diode 59. The output of tube 63 appears at the cathode 66 and is applied to one side of a balanced modulator 13. The output of a sub-carrier oscillator 14 is also applied to the modulator 13. The balanced modulator may be of the type described in Patent No. 2,313,583 issued on March 9, 1943 to H. C. Ressler.

The facsimile signal in the output circuit of tube 32 is also applied to the balanced modulator 13 through a second branch circuit including a differentiating circuit and vacuum tube 46. The junction of load resistors 33 and 34 is connected through differentiating capacitor 41 and differentiating resistor 47 to an appropriate voltage on the divider 49, 55, 56 and 57. The output of differentiator 41, 47 is applied through resistor 42 to grid 43 of tube 46. Plate 50 is connected to B+ and cathode 51 is connected through output resistor 53 to sliding contact 54 on divider resistor 55. The cathode 51 is also connected to balanced modulator 13 at the other side thereof.

Figure 2:
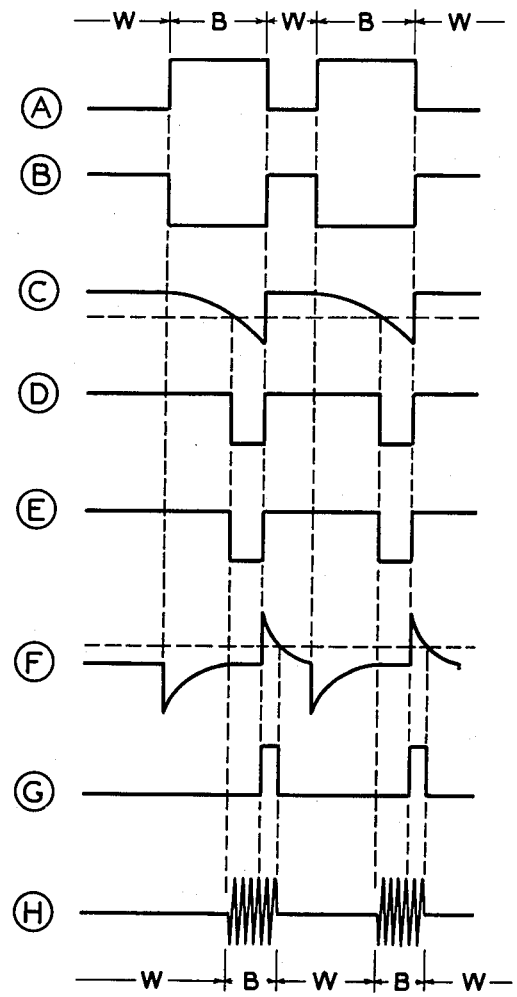
Fig. 2 is a representation of waveforms appearing at designated points in Fig. 1.

The operation of the circuit will now be described with the aid of the waveforms depicted in Fig. 2. Initially, photocell 1 is directed at white in the subject copy and the inputs to the balanced modulator 13 from the two branches are balanced by means of sliding contact 54 on divider resistor 55. When the modulator is balanced there is no output from the modulator. Under these conditions, i. e., when photocell 1 is looking at white, the negative voltage developed across resistor 26 and applied to grid 29 of tube 32 maintains tube 32 cut off, the high voltage on the plate of tube 32 is applied to grid 37 of tube 35 allowing it to charge capacitor 60 and maintain diode 59 non-conducting. Tube 63 is biased to conduct. Tube 46 in the other branch is also conducting and its output applied to modulator 13 balances the output from tube 63.

When in the scanning operation, the spot seen by photocell 1 shifts from white to black, the voltage at A goes up, allowing tube 32 to conduct causing the voltage at B to go down. The voltage at plate 30 of tube 32 goes down even more and when applied to grid 37 of tube 35 cuts the tube off. Capacitor 60 then discharges at a rate determined by the time constant of the capacitor in series with resistors 34, 40 and 49. When capacitor 60 discharges to the point where the voltage on cathode 58 of diode 59 is lower than plate 61, the diode conducts drawing current through resistors 57 and 64. This lowers the voltage at point D which is connected to grid 62 of tube 63. As a result, tube 63 cuts off and the voltage E at the cathode 66 drops sharply. This lowering of voltage E applied to modulator 13 unbalances the modulator and causes an output H which is representative of black. As is apparent from Fig. 2, the transition from white to black in the modulator is delayed relative to the time the copy seen by photocell 1 shifts from white to black. The amount of delay can be varied by varying capacitor 60. The delay can be made so great as to prevent the appearance of a black signal in the output prior to the time the photocell sees the next white copy. Great delays are sometimes needed and the second branch circuit is provided to prevent the loss of the black signal under these circumstances.

Referring now to the operation of the second branch circuit, the alternate high and low voltages at point B, representative of white and black, respectively, are applied to differentiator 41, 47. The resulting voltages at F are applied to the grid 43 of tube 46. Tube 46 is biased as a peak and threshold limiter so that the output at G is a square positive pulse following a transition from black to white. The width of the pulse is determined by the time constant of the differentiator and the bias on tube 46. This width may be varied by moving contact 48 on resistor 49. The pulse voltage G at the cathode 51 of tube 46 is applied to the other side of modulator 13 and results in an output signal H for a period after the copy seen by photocell 1 has shifted from black to white.

Returning now to the operation of the first branch circuit, when the copy under photocell 1 changes from black to white, voltage A falls, tube 32 cuts off, and its plate voltage rise applied to grid 37 of tube 35 allows a charging current to flow through tube 35 into capacitor 60. The sudden increase in voltage on the cathode 58 of diode 59 cuts the diode off thereby increasing the voltage at D to render tube 63 conductive. This raises the voltage E applied to the balanced modulator to the value corresponding to white. The second branch circuit continues to unbalance the modulator for a short time as previously described.

Figure 3:
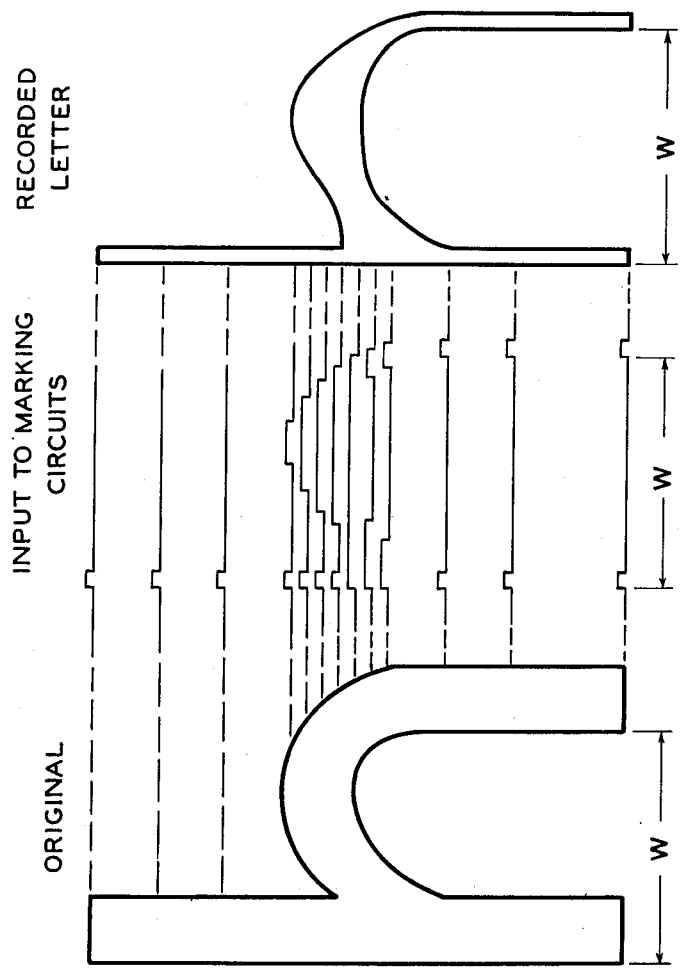
Fig. 3 illustrates a scanned character "h" and the modified character "h" which is recorded when the circuit of the present invention is employed.

The effect of the invention when scanning a character "h" is illustrated in Fig. 3. It is seen that the vertical portions of the character are narrowed. When the narrowed recorded character is in embossed form, it is easily read tactually by the blind. The recording may be graphic rather than embossed where it is desired to increase the legibility of visual information. It has been found that speed of comprehension is improved when vertical portions of characters are narrow.

It is also within the contemplated scope of this invention to widen the white spaces between black marks. The invention is also applicable to recording in reverse, i. e., white marks on a black background.

While a single embodiment of the invention has been shown and described it will be understood that this has been done by way of illustration rather than limitation and that the scope of the invention is indicated by the appended claims.

What is claimed is:

1. In a facsimile system, a source of rectangular electrical signal pulses derived from the point by point and line by line scanning of graphic copy, a differentiator and limiter circuit means receptive to pulses from said source and operative to convert said pulses to pulses of fixed duration, a signal transmission circuit means also receptive to the pulses from said source and operative to produce pulses of shortened duration and a balanced modulator connected to both of said circuit means for receiving and combining the pulses of fixed and of shortened duration to produce pulses having at least the said fixed duration.

2. In a facsimile system, a source of substantially rectangular electrical signal pulses derived from the point by point and line by line scanning of "black and white" graphic copy, differentiator and limiter circuit means receptive to rectangular pulses from said source and operative to produce pulses of fixed duration on transition from black to white, a pulse transmission circuit means also receptive to rectangular pulses from said source and operative to delay transition of the pulses only from a first level of amplitude to a second level of amplitude to produce pulses of the said second level of amplitude and of shortened duration, and a balanced circuit connected to both of said circuit means for combining the pulses of fixed duration and the pulses of shortened duration.

3. In a facsimile system, a source of substantially rectangular electrical signal pulses derived from the point by point and line by line scanning of "black and white" graphic copy, differentiator and limiter circuit means receptive to rectangular pulses from said source and operative to produce pulses of fixed duration on transition from black to white, a pulse transmission circuit means also receptive to rectangular pulses from said source and operative to delay transition of the pulses only from a first level of amplitude to a second level of amplitude to produce pulses of the said second level of amplitude and of shortened duration, and a balanced modulator connected to both of said circuit means for receiving said shortened pulses and said pulses of fixed duration to produce pulses having the said second level of amplitude and at least the said fixed duration.

4. In a facsimile system, a source of substantially rectangular electrical signal pulses derived from the point by point and line by line scanning of "black and white" graphic copy, differentiator and limiter circuit means receptive to rectangular pulses from said source and operative to produce pulses of fixed duration on transition from black to white, signal transmission circuit means also receptive to rectangular pulses from said source and operative to delay transition of the pulses only from a first level of amplitude to a second level of amplitude to produce pulses of the said second level of amplitude and of shortened duration, both of said circuit means being connected to another circuit means for combining the pulses of fixed duration and the pulses having the same second level of amplitude and shortened duration to produce modified pulses having the said second level of amplitude and at least the said fixed duration, and means connected to the last mentioned circuit means for recording the modified pulses, whereby graphic characters of the recorded copy will have vertical components of a reduced width at least equal to a predetermined width.

References Cited in the file of this patent
UNITED STATES PATENTS

| | | |
|---|---|---|
| 2,118,626 | Smith | May 24, 1938 |
| 2,240,420 | Schnitzer | Apr. 29, 1941 |
| 2,278,692 | Eller | Apr. 7, 1942 |
| 2,376,034 | Collings | May 15, 1945 |
| 2,421,138 | Wheeler | May 27, 1947 |
| 2,484,352 | Miller | Oct. 11, 1949 |